D. Dunton,
Churn.
№ 53,591.  Patented Apr. 3, 1866.
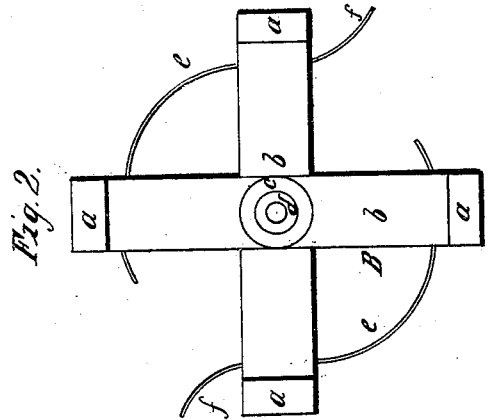
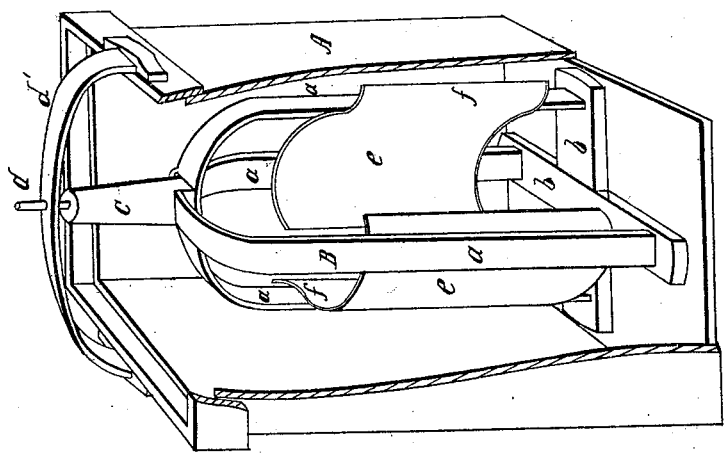
Witnesses:  Inventor:

UNITED STATES PATENT OFFICE.

DANIEL DUNTON, OF BROOKLYN, NEW YORK.

IMPROVEMENT IN CHURNS.

Specification forming part of Letters Patent No. 53,591, dated April 3, 1866.

*To all whom it may concern:*

Be it known that I, DANIEL DUNTON, of Brooklyn, Kings county, State of New York, have invented a new and Improved Churn; and I do hereby declare that the following is a full, clear, and exact description thereof, which will enable others skilled in the art to make and use the same, reference being had to the accompanying drawings, forming part of this specification, in which—

Figure 1 is a perspective view of my invention with a portion of the case of the churn removed; Fig. 2, a detached plan or top view of the dasher.

Similar letters of reference indicate like parts.

This invention relates to a new and improved churn of that class which is provided with rotary dashers; and it consists in a novel construction of the dasher, as hereinafter fully shown and described, whereby the cream is not only agitated in an eminent degree and the butter expeditiously produced, but the butter also gathered with the greatest facility.

A represents the case or box of the churn, which may be of rectangular or other proper form, and B is the dasher, placed centrally and vertically within the case or box A. This dasher has what may be termed a "hollow center," its main portion consisting of four bars, $a$, the lower ends of which are secured to the outer parts of two bars, $b\ b$, which cross each other at right angles, and have a pendent pivot at their centers to fit in a stop at the bottom of the case or box. The upper parts of the bars $a$ are curved or bowed, forming an arch, at the top of which there is a spindle, $c$, having a journal, $d$, in its upper end to fit in a cross-bar, $d'$, extending across the case or box A. The bars $a$ have two curved plates, $e\ e$, attached to them. These plates may be described as being portions of a cylinder, their convex surfaces being outward, and having an end projecting out from the dasher, and curved outward from the dasher in flaring form, as shown at $f$, in order to gather the cream and force it inward to the center of the dasher, the flaring surfaces $f$ being at opposite sides of the dasher, as shown clearly in Fig. 2.

By this arrangement the dasher, which may be rotated in any proper way, will act in the most efficient manner upon the cream, subjecting it to a considerable degree of agitation, and the curved plates $e\ e$ have a tendency to gather the butter and keep it in a mass, instead of breaking it up and destroying its grain, which renders it oily and greatly deteriorates it in value.

Having thus described my invention, I claim as new and desire to secure by Letters Patent—

The rotary dasher B, constructed with an open center, substantially as shown, in combination with the plates or gatherers $e\ e$, all arranged substantially in the manner as and for the purpose specified.

The above specification of my invention signed by me this 6th day of February, 1866.

DANIEL DUNTON.

Witnesses:
M. M. LIVINGSTON,
EDWARD H. KNIGHT.